July 18, 1961 D. DANIELSEN 2,993,094

FREQUENCY SELECTIVE SIGNALING SYSTEM

Filed Oct. 10, 1958 5 Sheets-Sheet 1

INVENTOR
D. DANIELSEN
BY
S.E. Hollander
ATTORNEY

INVENTOR
D. DANIELSEN
BY S.E. Hollander
ATTORNEY

INVENTOR
D. DANIELSEN
BY S.E. Hollander
ATTORNEY

July 18, 1961 D. DANIELSEN 2,993,094

FREQUENCY SELECTIVE SIGNALING SYSTEM

Filed Oct. 10, 1958 5 Sheets-Sheet 4

INVENTOR
D. DANIELSEN
BY S.E. Hollander
ATTORNEY

FREQUENCY SELECTIVE SIGNALING SYSTEM

Filed Oct. 10, 1958 5 Sheets-Sheet 5

INVENTOR
D. DANIELSEN
BY S.E. Hollander
ATTORNEY

2,993,094
FREQUENCY SELECTIVE SIGNALING SYSTEM

Daniel Danielsen, Bloomingdale, N.J., assignor to Bell Telephone Laboratories, Incorporated, New York, N.Y., a corporation of New York Filed Oct. 10, 1958, Ser. No. 766,519
20 Claims. (Cl. 179—27)

This invention relates to signaling systems and more particularly to frequency selective signaling systems for controlling the state of signal lamps at a telephone subscriber's location.

Conventional prior practices in the operation of a private branch exchange (P.B.X) dictate the termination of P.B.X stations at an instrumentality or switchboard located on or proximate to the premises of the customer.

Connections may be extended to the telephone central office over a group of shared trunks which are, in general, far smaller in number than the number of P.B.X stations. Since each P.B.X station is terminated within the P.B.X facilities are available for monitoring, supervising or assisting in the completion of a call by a P.B.X attendant by bridging or testing a P.B.X station line, usually at the P.B.X switchboard.

In certain electronic switching arrangements, however, provisions may be made for directly connecting and terminating each P.B.X station or other customer group station at the telephone central office in lieu of concentration through a switchboard or other apparatus as in conventional practice.

This radical departure in customer group service, in which the usual P.B.X switchboard at the subscriber's premises is eliminated, generates the problem of providing a new arrangement for monitoring or assisting calls to and from the P.B.X.

Since the P.B.X attendant no longer has local access to other lines in the P.B.X but can communicate therewith only through the central office, information regarding the condition of a particular line or lines in a customer group must originate at the central office. The intelligence must then be further conveyed to provide information to the P.B.X attendant or other personnel required to be informed as to the disposition of any given line in the customer group.

It is, therefore, an object of this invention to provide improved means for supplying information at the subscriber location concerning the condition of all lines in a particular customer group.

It is a further object of this invention to provide for subscriber signaling within the normal voice transmission frequency band of a subscriber's line.

An additional object of this invention is to provide a signaling path for the transmission of control signals, which path is similar to any other speech transmission path in the office.

A further object of this invention is to provide a signaling arrangement adapted for use with concentration.

Still another object of this invention is to provide signaling apparatus arranged to be used with private branch exchange arrangements or executive-secretary signaling configurations.

A further object of this invention is to provide for the operation of indicating equipment at the subscriber's location by control signals from an electronic central office.

An additional object of this invention is to provide for subscriber signaling through the utilization of serially transmitted trinary words.

A further object is to provide for the transmission of control signals in a minimal period of time.

Still another object is to provide for controlling indicating equipment at the subscriber's location by utilizing relatively simple and inexpensive circuitry at the central office.

A further object of this invention is to reduce the holding time of the transmission path through which the control signals are transmitted from an electronic central office to a subscriber's location.

Another object of this invention is to control a relatively greater number of remote indicating lamp circuits from a smaller number of transmission circuits in the electronic central office.

These and other objects of the invention have been achieved in an exemplary embodiment by utilizing a transmitter at the central office capable of generating a serial trinary word of four digits having three possible frequencies in each of four distinct and successive time intervals. Lamp control circuits are located at the subscriber's premises and are controlled directly by signals from the electronic central office. When a control signal is to be transmitted to a particular lamp control circuit, a connection is established between the central office generating equipment and a particular signaling path. Control equipment in the central office energizes a tone switch to generate a particular serial trinary word indicative of the condition of a line included within the customer group associated with the selected lamp control circuit. After the serial trinary word has been transmitted, the path through the network may be discontinued. The lamp control circuit at the subscriber's location will assume a state determined by the incoming control signals and will remain in that state until directed to assume a different state.

At the subscriber's location, the circuitry includes two parallel-connected shift register stages driven by a tone detector circuit comprising three tuned circuits individually responsive to the three possible frequencies. The tone detector, through a gate, connects to the first bistable element in each of the two shift registers and also to a shift amplifier. When an element of a serial trinary word is received, the detector energizes the shift amplifier which, in turn, shifts the information on every flip-flop or bistable element one step to the right. This process is repeated four times in the reception of a complete trinary word.

Every flip-flop has one connection to a lamp amplifier. When a flop-flop is in a particular state or "set" it will energize its lamp amplifier and light the associated lamp. In one embodiment, the lamps connected to one of the two shift registers will be lighted steadily. The lamps connected to the other shift register will flash on and off.

In another embodiment of the invention, all of the lamp amplifiers are connected to a clamping lead and a monostable flasher triggered by the incoming control signal determines the length of time the lamps will be lighted.

The particular configuration of lamps that are lighted after the reception of the serial trinary word determines the condition of the line concerning which information is being transmitted from the central office.

A feature of the instant invention is two parallel-connected shift registers driven by the output of a common tone detector circuit.

An additional feature of this invention is an improved shift register gate between adjacent shift register stages.

Another feature of this invention is a relatively small number of lamp circuits arranged to indicate a greater number of possible circuit conditions.

A further feature is a group of lamp control circuits for indicating the condition of executive lines in an executive-secretary arrangement.

Still another feature of this invention is a group of lamp control circuits adapted to indicate to a P.B.X attendant what procedure to implement in completing a call to or from the P.B.X.

These and other objects and features of the invention will be more apparent from an understanding of the following detailed description and attached drawing, in which:

FIG. 1 is a block diagram of the general arrangement of the invention;

FIG. 1A indicates the time sequence of a representative trinary word;

*General description*

Figure 1:
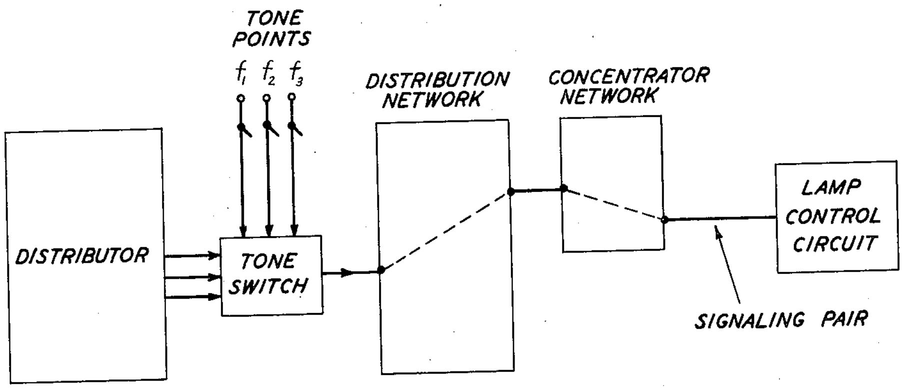

FIG. 1 illustrates a block diagram of the general signaling arrangement employed in the present invention. A serial trinary word is generated in the distributor and tone switch. The tone switch has three frequencies *f*1, *f*2 and *f*3 connected thereto. These frequencies are provided from appropriate sources and provide continuous frequencies to the tone points.

In transmitting a control signal to a particular lamp control circuit, a path is established between an idle tone switch and a signaling pair extending through the distribution network and concentrator network to the selected lamp control circuit. Apparatus in the central office operates to energize the distributor which, in turn, controls the tone switch to transmit a particular serial trinary word indicative of the information to be imparted to the selected lamp control circuit. After the word has been transmitted the transmission path through the network can be disestablished.

The lamp control circuit assumes a unique state in response to the incoming signals. The tones *f*1, *f*2 and *f*3 are selected from available ringing frequencies that are normally present in an electronic central office.

Figure 2:
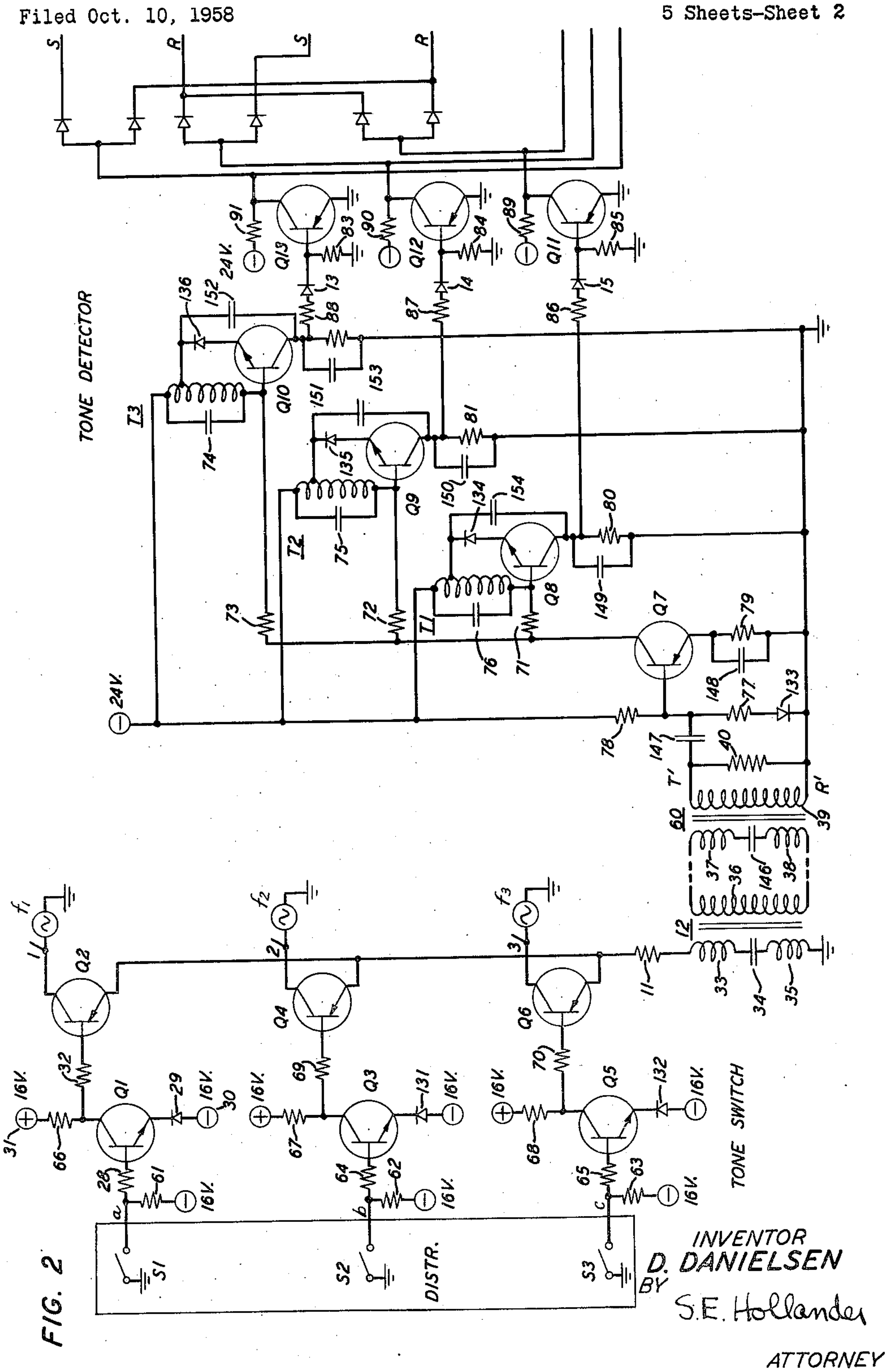
FIG. 2 shows a tone switch at the central office for generating a serial trinary word of three possible frequencies, and a tone detector at the subscriber location adapted to receive the serial trinary word.

The distributor shown in box form in FIG. 2 is assumed to contain appropriate apparatus for energizing one of the three transistors Q1, Q3, Q5 and is symbolically shown as switches S1, S2, S3, connected to a source of reference potential. Each switch, for example switch S1, has a gating transistor Q1 conected thereto. The three switches S1, S2 and S3 are normally open. When a particular switch is closed, its associated gating transistor will be energized and the voltage at the collector thereof experiences an excursion from a positive collector potential to a voltage approaching the emitter potential. While schematically shown as switches S1, S2, and S3, it is to be understood that these switches may readily be electronic pulse sources whose state of energization is determined by control circuitry in the central office dependent upon the information to be transmitted to the subscriber's premises. However for purposes of explanation of this invention the switches shall be assumed to be manual switches which are operated in accordance with information available in the central office.

Figure 1A:
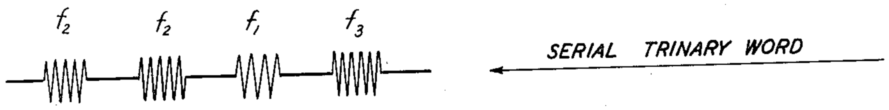
Figure 6A:
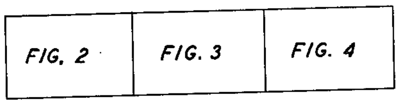
FIGS. 6A and 6B indicate the manner in which FIGS. 2 to 5 may be relatively disposed to disclose the unattended customer arrangement and the attended customer arrangement respectively.
Figure 6B:
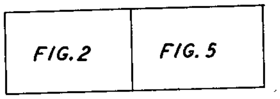

Connected serially to each of the gating transistors Q1, Q3, Q5 are transistors Q2, Q4 and Q6, respectively. The latter transistors serve to gate the application of signals from sources *f*1, *f*2 and *f*3 to the transmission line and remote subscriber's location over resistance 11 and coil 12. By sequentially energizing switches S1, S2 and S3 in appropriate time order a serial trinary word having four digits is generated, each digit being in a distinct time interval (of illustratively 15 milliseconds duration) separated from adjacent digits by a suitable guard interval which may, advantageously, be as long as the time interval. One such exemplary four-digit serial trinary word is shown illustratively in FIG. 1A.

At the subscriber's location, a tone detector having a transformer coupled input 60 is located. A common amplifier Q7 supplies current to each of the three tuned circuits including transistors Q8, Q9 and Q10. Three separate tank circuits T1, T2 and T3 are individually connected to transistors Q8, Q9 and Q10, respectively. Each tank circuit is designed to present a high impedance to signals at one of the three possible frequencies and permit the transmission therethrough of signals at the other frequencies.

The outputs at each transistor Q8, Q9 and Q10 are integrated in their respective collector circuits and the direct-current variations at the collectors are instrumental in driving an additional amplification stage including transistors Q11, Q12 and Q13. A trigger threshold is established by the use of Zener or breakdown diodes 13, 14 and 15 in the base leads to the pulse amplifiers.

The output of each of the amplifiers Q11, Q12 and Q13 is connected through a pair of diodes to the first flip-flop stage of shift registers A and B. In addition, an output from each of the amplifiers Q11–Q13 is connected through a gate including diodes 16, 17 and 18 to the shift amplifier.

Figure 3:
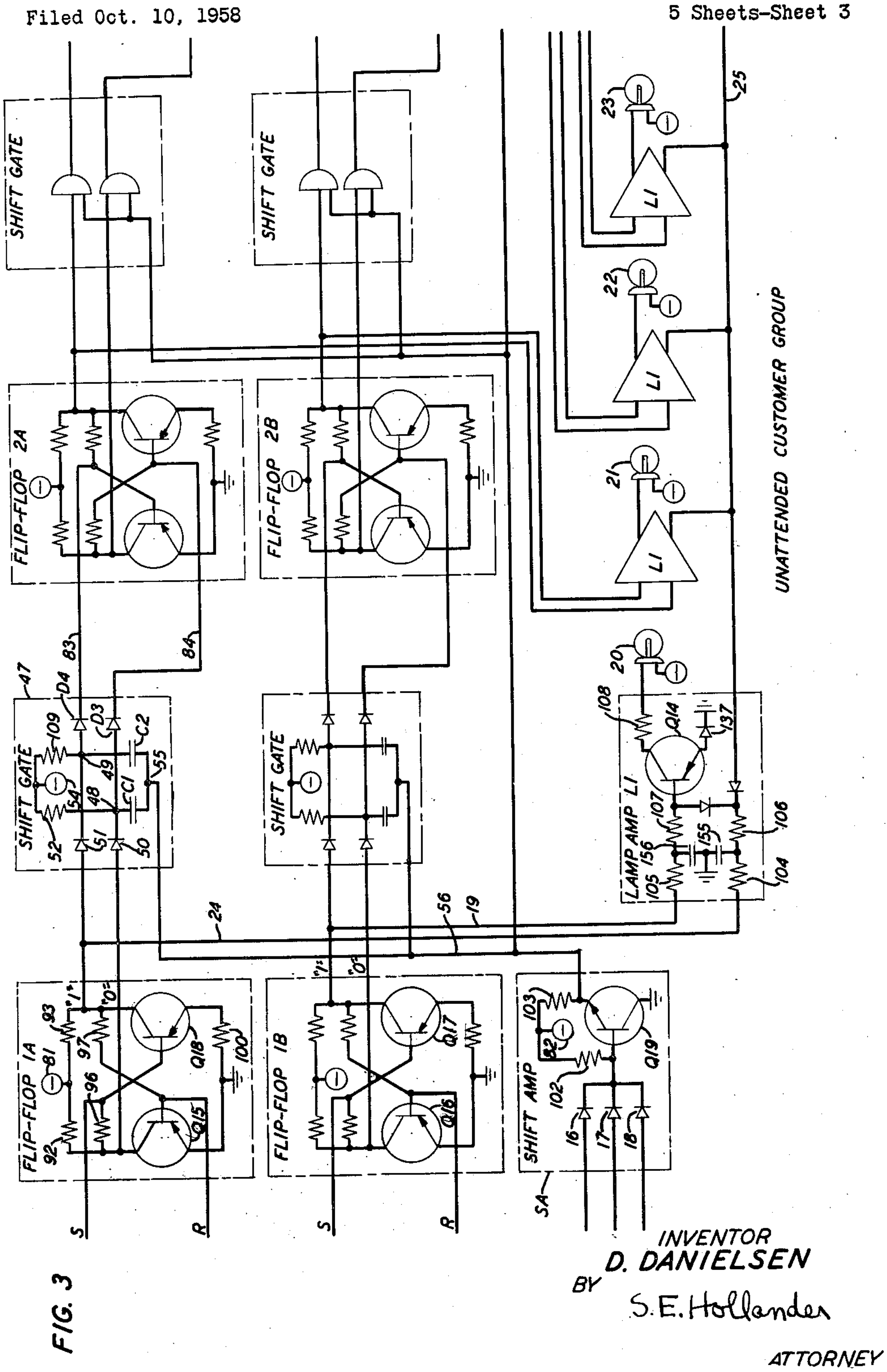
FIGS. 3 and 4 show the shift register circuitry, lamp amplifiers and interrupter for an unattended customer group controlled by the operation of the tone detector of FIG. 2.

The shift registers A and B of FIG. 3 include parallel stages of flip-flops shown in detail for stages 1A, 1B, 2A and 2B. Each flip-flop is considered to be in the "1" state when the output terminal "1" has a high negative potential and in the "0" state when the output terminal labeled "0" is at a high negative potential.

Adjacent flip-flops in the shift register are joined by means of a shift gate shown in detail between stages 1A and 2A, and 1B and 2B. The shift register is designed to transfer information sequentially from one stage to the next succeeding stage on the advent of a shift pulse from the shift amplifier. The shift amplifier in turn is controlled by the appearance of signal pulses at its "OR" gate input including diodes 16, 17 and 18.

Individual lamp amplifiers are connected to the collector circuits of the flip-flops and are responsive to binary "1" conditions in the flip-flops. Each lamp amplifier L1 has two driving leads 19 and 24 connected to the base terminal. The amplifier is energized in response to the activation of either of the two leads. Driving lead 24, however, is clamped to a free-running interrupter shown in FIG. 4. The interrupter produces a flashing condition of the lamp. Thus driving lead 19 will energize transistor Q14 and light lamp 20 steadily whereas driving lead 24 is clamped to the interrupter over lead 25.

Figure 5:
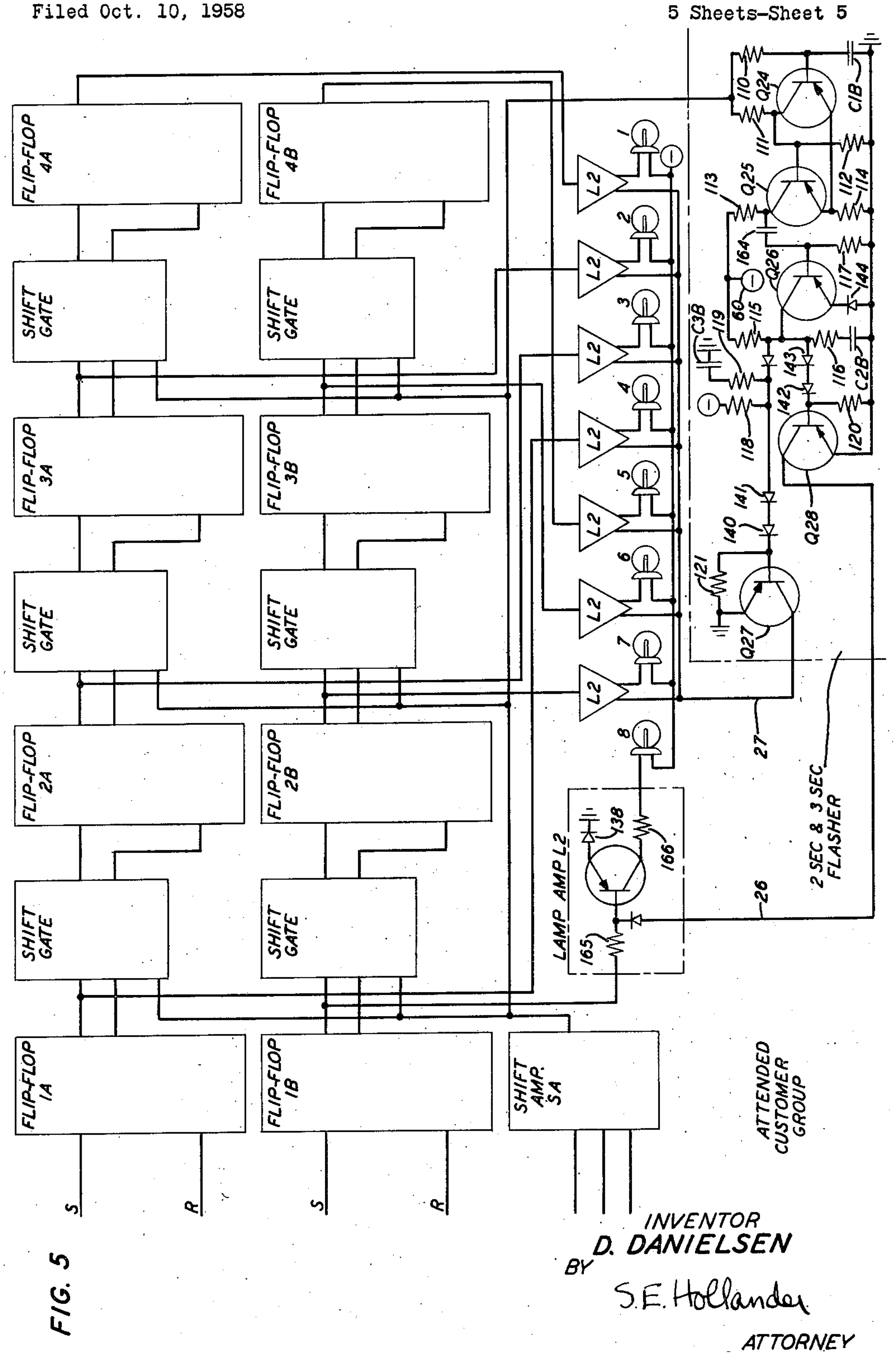
FIG. 5 shows the lamp amplifiers for an attended customer group controlled by the operation of the tone detector of FIG. 2 and also a flasher for use with the lamp amplifiers.

In an attended customer group, i.e., where a P.B.X operator is on duty, lamp amplifier L2 (FIG. 5) is normally clamped in the off condition over lead 26 and is lighted when the flasher of FIG. 5 is energized, as explained herein.

It will be noted in examination of lamp amplifier L1 of FIG. 3 that both driving leads 19 and 24 include RC delay networks having resistor 104 and capacitor 155, and resistor 105 and capacitor 156. The insertion of these resistance-capacitance delays in the driving leads is useful in preventing flickering of the associated lamps that might otherwise take place during the interval in which the serial trinary word is being transmitted.

The lamp amplifiers L2 of FIG. 5 do not include similar delay networks for preventing flicker but, instead, presuppose the use of frequencies that produce only a single set pulse in the series of four pulses. When only a single set pulse is transmitted, the individual flip-flops comprising the shift register stages are not energized for a sufficient period of time to permit the associated lamp amplifiers to be energized and to heat the filament of the lamp connected thereto. It is understood that, although separate resistance-capacitance delay network arrangements are not made in the case of lamp amplifier L2, in view of the nature of the pulses received in the attended customer arrangement, the inclusion of delay facilities similar to those utilized in FIG. 3 would be effective to prevent flicker under transmission conditions similar to those encountered in FIG. 3 (i.e., where more than one set pulse in the group of four pulses may be utilized).

The interrupter shown in detail in FIG. 4 operates as a free-running device with a .5-second on period and a .5-second off period when the circuit parameters hereinafter indicated are employed. A flasher having a two or three-second period in accordance with the utilization of output lead 27 or 26, respectively, with the parameters given hereinafter, is also shown in detail in FIG. 5.

*Detailed description*

Assuming that the signaling system is to be utilized to indicate the condition of a particular telephone substation in an unattended customer group or executive-secretary signaling arrangement, one of the three switches S1–S3 will be closed by means not shown herein as not essential to an understanding of the present invention. If switch S1 is assumed to be closed, transistor Q1 is rendered conducting through the application of a positive potential to the base with respect to the emitter of the transistor.

When transistor Q1 conducts, the collector potential thereof is reduced from the potential of source 31 to a potential approaching that of source 30. This negative voltage excursion appears on the base of transistor Q2 over resistor 32 and renders transistor Q2 conducting. Signals at the frequency of generator F1 are transmitted through the collector-emitter circuit of transistor Q2, resistor 11, winding 33, capacitor 34 and winding 35 to ground. The signals are further transmitted by induction to winding 36 and over a transmission path T and R (which may include distribution and concentration networks indicated in FIG. 1) to transformer 60. The signals are again transformed from windings 37 and 38 to winding 39 and a voltage drop appears across resistance 40 connected between conductors T1 and R1. This voltage is coupled through capacitor 147 to the base of transistor Q7. Transistor Q7 amplifies the signals appearing at its base and transmits the amplified signal to the tank circuits T1–T3.

Each tank circuit is tuned to one of the three signaling frequencies F1–F3. Assuming that tank T1 is resonant at frequency F1, the strongest input signal will appear at the base of transistor Q8, driving that transistor into conduction. The amplified output frequency or tone in the collector circuit of transistor Q8 is integrated by capacitor 149 and resistor 80 and the direct-current components of the output of transistor Q8 are used to energize transistor Q11 over resistor 86 and diode 15. The latter is a breakdown or Zener diode adapted to break down in the reverse conduction direction at a voltage level corresponding to a desired trigger threshold. Thus, similar signals which are lower than the predetermined trigger threshold appearing at the input to diodes 14 and 13 will not be of sufficient magnitude to break down these diodes and cause transistors Q12 or Q13 to conduct. In consequence of the trigger threshold created by Zener diodes 13, 14 and 15, the frequency selectivity of the detector is not critical.

Assuming that the output of transistor Q8 is sufficient to break down Zener diode 15, transistor Q11 conducts in consequence of the negative voltage appearing at the input thereof. The output of transistor Q11 is connected to diodes 45 and 46 which are, in turn, connected to transistors Q15 and Q16, respectively. The positive voltage signal appearing at the bases of transistors Q15 and Q16 drives those transistors to the "off" or high impedance condition and through conventional flip-flop practice drives transistors Q17 and Q18 into the conducting or low impedance condition. Thus flip-flops 1A and 1B of shift registers A and B are both in the "0" condition since the output leads "0" of both flip-flops are at a relatively high negative potential.

Flip-flop 1A is joined to flip-flop 2A through shift gate 47. Terminals 48 and 49 of shift gate 47 ordinarily have a voltage thereon corresponding to the potentials on the collectors of the flip-flop 1A. As a result, a small current flows in the forward direction through diodes 50 and 51 and resistors 52 and 109 to negative battery 54. Terminal 55 of shift gate 47 is connected to shift conductor 56 from shift amplifier SA. The shift amplifier SA comprises a transistor Q19 having its collector connected to ground and a source 82 of negative potential connected through a resistor 102 to its base and through a resistor 103 to its collector. On energization of any of transistors Q11, Q12, or Q13 by their tank circuits an activating pulse is applied to the base of the transistor Q19 through one of the leads of the "OR" gate including diodes 16, 17, and 18. Energization of transistor Q19 then applies a shift pulse to the shift conductor 56 connected to the emitter of transistor Q19.

The conductors 83 and 84 connected to the bases of the transistors of flip-flop 2A experience a potential approaching ground. Consequently, no steady-state current flows through diodes D3 and D4.

Under the assumed conditions, flip-flop 1A is in the "0" or reset condition. Thus terminal 48 has a voltage approaching the potential of source 81 and terminal 49 has a voltage of near ground potential.

Assuming further that source 81 and source 82 of the shift amplifier SA are at the same voltage, the net charge across capacitor C1 approaches zero while that across C2 is approximately the voltage of potential source 81.

If an additional signal of frequency F1 is generated by closing switch S1 momentarily, as described above, flip-flop 1A will again be energized to render transistors Q17 and Q18 conducting in the manner described heretofore. It will be noted that the same pulse applied to flip-flops 1A and 1B from transistor Q11 is also applied over diode 16 to energize transistor Q19 thereby raising the potential on shift conductor 56 from approximately the potential of source 82 to ground potential. Capacitor C2 will now discharge through the base of the left-hand transistor of flip-flop 2A to render that transistor non-conducting. Thus, after the termination of the second signal and the shift pulse, flip-flops 1A and 1B store information corresponding to the second signal at frequency F1 and flip-flops 2A and 2B store information corresponding to the first signal at frequency F1 which was previously stored in flip-flop 1A. In similar fashion, the state of each flip-flop is transferred to the next succeeding stage on the advant of the following signal and the current pulse from the shift amplifier. This procedure continues until four signal pulses are transmitted at which time the shift registers A and B contain information corresponding to all of the four signal pulses, the first signal pulse being stored in flip-flops 4A and 4B and the last signal pulse being stored in flip-flops 1A and 1B.

Although signals at frequency F1 have been used as illustrative, it is apparent that signals at F2 and F3 will condition stages 1A and 1B to the "0" and "1" conditions and the "1" and "0" conditions respectively. Transfer to succeeding stages is effected in the manner described above.

Figure 4:
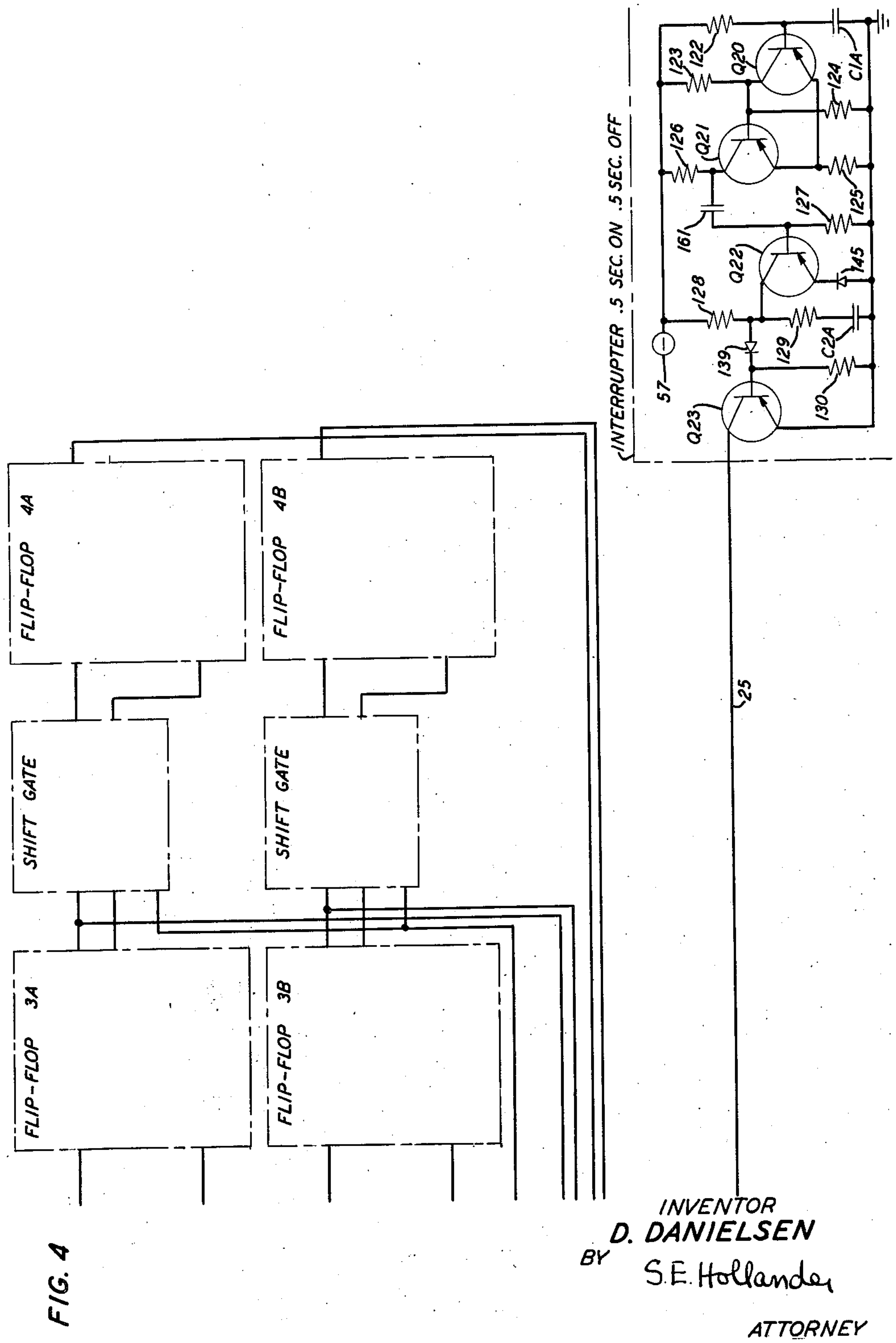

The information stored in the four stages of shift registers A and B of FIGS. 3 and 4 is adapted to indicate the condition of a particular line in the unattended customer group served by the equipment. For example, in an executive-secretary arrangement it is possible for a secretary by observation of the signal lamps to learn the state or condition of the executive telephones, i.e., busy, idle or being rung. Thus the secretary is equipped to answer or hold calls for one or more of a group of executives.

As indicated heretofore, the lamps 20–23 of FIGS. 3 and 4 will be intermittently interrupted when a "1" condition exists in shift register stages 1A–4A. The interrupter arrangement of FIG. 4 is predicated on a free-running multivibrator including transistors Q20 and Q21. Capacitor C1A connected to the base lead of transistor Q20 charges to a negative potential from source 57. When the base-emitter junction of transistor Q20 is forward-biased transistor Q20 enters the conductive state and capacitor C1A begins to discharge. The voltage at the collector electrode of transistor Q20 undergoes a positive excursion from a voltage approaching that of source 57 to ground potential. The positive swing on the collector electrode of transistor Q20 is applied to the base electrode of transistor Q21, reverse biasing the base-emitter junction thereof. The reverse bias is further increased by current flow through resistor 125 which drives the potential at the emitter electrode of transistor Q21 more negative.

This condition obtains until capacitor C1A discharges sufficiently to reduce the bias across the base-emitter junction of transistor Q20 to a point where that transistor becomes non-conducting. At this time the collector electrode of transistor Q20 again approaches the potential of source 57 driving transistor Q21 into the "on" condition. The added current flow through resistor 125 in consequence of the conduction of transistor Q21 assists in turning off transistor Q20.

The collector electrode of transistor Q21 supplied a negative-going pulse to the base electrode of transistor Q22 through capacitor 161 to drive transistor Q22 into the conducting condition. Capacitor C2A, which was previously charged to a voltage approaching that of source 57, now discharges through resistor 129 and transistor Q22. When capacitor C2A is discharged to a sufficient degree, transistor Q23, which was biased in the conducting condition by the comparatively high negative voltage on capacitor C2A, turns off. In doing so, the ground clamp on conductor 25 is removed and transistor Q14 is operative and adapted to energize the lamp 20 when the associated flip-flop is in the "1" state.

When transistor Q22 reenters the non-conducting state at the termination of the output pulse of transistor Q21, capacitor C2A recharges from source 57 over resistances 128 and 129. After a predetermined interval capacitor C2A recharges to a level adequate to bias the base-emitter junction of transistor Q23 in the conducting direction to reapply the ground clamp to conductor 25.

In the interim, capacitor C1A recharges from source 57 to a voltage level sufficient to bias transistor Q20 in the conducting direction to recommence the cycle.

FIG. 5 depicts a group of shift registers similar to those disclosed in FIGS. 3 and 4 as utilized in an attended customer group, i.e., a private branch exchange served by an attendant or operator. In FIG. 5 a separate lamp amplifier L2 is connected to the output of each of the shift register stages.

The functions of the lamp indications in FIG. 5 depart to some extent from those of FIGS. 3 and 4. In the embodiment of FIG. 5, the lamps are utilized to indicate separate functions or commands to the attendant. For example, an indication on a particular lamp might signify that an incoming call is being placed to the private branch exchange rather than directly to a particular extension in the exchange, and that the attendant is expected to dial a particular code in order to be connected to the incoming line.

A further lamp indication may illustratively signify that a call intended for a private branch exchange extension has encountered a busy condition. By dialing another code the operator will gain access to the incoming line to advise the calling party of the condition.

The arrangement of the lamps in FIG. 5 provides that the lamp amplifiers L2 are normally clamped in the "off" state over conductors 26 and 27 and are energized for a brief period of time when the flasher of FIG. 5 is in the off-normal state. In examining the operation of the flasher of FIG. 5, a comparison may be made with the interrupter of FIG. 4. In lieu of a free-running multivibrator, however, transistor Q25 is energized by a signal from the shift amplifier. A positive pulse from the output of the shift amplifier SA, which may be the same as the shift amplifier shown in detail in FIG. 3, drives transistor Q25 into the non-conducting condition. Capacitor C1B and transistor Q24 have in this case no electrical functions to perform. They are shown to illustrate that a few external wiring changes will change the flasher circuit into the free-running interrupter which is described above and shown in FIG. 4. Transistor Q26 enters the "on" condition in the manner explained for transistor Q22 and capacitors C2B and C3B discharge through resistances 119, 116 and transistor Q26.

The voltage at the capacitors C2B and C3B and consequently at the base electrode of transistors Q27 and Q28 rapidly approach a level adequate to cut off both transistors. In doing so, the ground clamp is removed from conductors 26 and 27 and any lamp amplifier L2 can be energized to illuminate the associated lamp in accordance with the condition of the shift register stages. When the negative-going pulse on the collector of transistor Q25 terminates, transistor Q26 is again cut off and capacitor C2B begins to charge from source 60. The voltage at the base electrode of transistor Q28 increases until that transistor turns on thereby deenergizing lamp amplifier L2.

It will be noted that transistor Q25 entered the non-conducting condition when a positive pulse or train of pulses was received from the shift amplifier. At the end of a pulse the transistor Q25 will return to its conducting condition and transistor Q26 will assume its "off" condition. The collector of Q26 will again be free to charge the potential of source 60.

Transistor Q27 serves a function similar to that of Q28. However, the parameters of capacitance C3B and resistance 119 are such that a different rate of flashing is obtained related to the interval of time required to charge capacitor C3B.

In FIG. 5 transistor Q28 is shown connected to one lamp amplifier and transistor Q27 to the remaining lamp amplifiers. This arrangement is merely illustrative and may be altered where appropriate.

The following are illustrative of the values that the circuit parameters may assume in an exemplary embodiment of the invention:

| Resistances: | Ohms |
|---|---|
| 11 | 900 |
| 28 | 6,200 |
| 32 | 22,000 |
| 40 | 2,000 |
| 52 | 54,000 |
| 61 to 63, incl. | 1,500 |
| 64 | 6,200 |
| 65 | 6,200 |
| 66 to 68, incl. | 7,500 |
| 69 | 22,000 |
| 70 | 22,000 |
| 71 | 180,000 |
| 72 | 220,000 |
| 73 | 330,000 |
| 77 | 10,000 |
| 78 | 150,000 |
| 79 | 47,000 |
| 80 to 85, incl. | 10,000 |
| 86 to 91, incl. | 5,100 |
| 92 | 909 |

| Resistances: | Ohms |
|---|---|
| 93 | 909 |
| 96 | 3,300 |
| 97 | 3,300 |
| 100 | 200 |
| 102 | 7,500 |
| 103 | 1,000 |
| 104 to 107, incl. | 3,000 |
| 108 | 150 |
| 109 | 54,000 |
| 110 | 560,000 |
| 111 | 6,200 |
| 112 | 10,000 |
| 113 | 2,000 |
| 114 | 2,000 |
| 115 | 56,000 |
| 116 | 220 |
| 117 | 5,100 |
| 118 | 56,000 |
| 119 | 220 |
| 120 | 56,000 |
| 121 | 56,000 |
| 122 | 560,000 |
| 123 | 6,200 |
| 124 | 10,000 |
| 125 | 2,000 |
| 126 | 2,000 |
| 127 | 5,100 |
| 128 | 56,000 |
| 129 | 220 |
| 130 | 56,000 |
| 165 | 6,000 |
| 166 | 150 |

| Frequency: | Cycles per second |
|---|---|
| F1 | 1,000 |
| F2 | 810 |
| F3 | 656 |

All potentials not otherwise indicated are −24 volts.

Diodes:

| | |
|---|---|
| 13 to 15 inclusive; 29; 131 to 145, inclusive | Zener type diodes 5 volt breakdown potential. |

All other diodes are Hughes type 1N100 or the like.

| Capacitors: | Microfarads |
|---|---|
| C1 | 0.5 |
| C2 | 0.5 |
| C1A | 4 |
| C2A | 25 |
| C1B | 4 |
| C2B | 75 |
| C3B | 50 |
| 34 | 2 |
| 74 | 0.1 |
| 75 | 0.06 |
| 76 | 0.04 |
| 146 | 2.25 |
| 147 | 0.01 |
| 148 to 151, inclusive | 0.5 |
| 152 to 154, inclusive | 0.25 |
| 155 | 50 |
| 156 | 50 |
| 158 | 4 |
| 161 | 4 |
| 162 | 4 |
| 163 | 25 |
| 164 | 4 |

Lamp amplifier transistor—Sylvania 2N101 or the like.

All other PNP transistors are Raytheon 2N112/CK760 or the like and all NPN transistors are Sylvania 2N94A or the like.

While in the two embodiments of the invention described above four digit trinary words have been employed with two parallel shift registers each having four stages, it is to be understood that words with different number of digits may also be employed depending on the amount of different types of information to be transmitted from the central office to the subscriber's premises, in which cases the parallel shift registers will have additional stages, there being one stage for each digit of the transmitted trinary word.

It is understood that various modifications and departures may be made from the above illustrative embodiments by those skilled in the art without departing from the spirit and scope of the invention.

What is claimed is:

1. A telephone signaling system including generating means for generating a sequential series of alternating-current pulses of different frequencies in accordance with a code combination, a plurality of parallel-connected shift registers, detector means for coupling said generating means to said shift registers, and means included in said detector means selectively responsive to the generation of said alternating-current pulses to condition said shift registers simultaneously to a state representative of said particular code combination.

2. A telephone signaling system in accordance with claim 1 wherein said shift registers comprise, in addition, a shift register gate including first and second input diodes, first and second output diodes, a pair of intermediate terminals serially coupling said first input diode to said first output diode and said second input diode to said second output diode, said terminals being adapted to assume a potential indicative of particular binary conditions, output conductors connected to said output diodes, a pair of condensers individually connected to said terminals and adapted to assume charges corresponding to said binary conditions, said condensers being responsive to the application thereto of an advance pulse to condition said output diodes and output conductors to potentials representative of said particular binary condition, and a source of reference potential connected to said terminals.

3. An automatic telephone signaling system including a frequency generator for generating a series of alternating-current pulses of varying frequencies in accordance with a code combination, a plurality of parallel-connected shift registers, each of said shift registers including a plurality of stages, frequency discriminating means coupling said generating means to said shift registers, means included in said frequency discriminating means selectively responsive to said alternating-current pulses to simultaneously condition said shift register stages to binary states representative of said particular code combination; and a plurality of lamp amplifiers individually connected to said shift register stages operable in response to the occurrence of a particular state in said stages for indicating the binary condition of said stages.

4. A telephone signaling system in accordance with claim 3 including, in addition, output terminals on each of said stages and wherein said lamp amplifiers are connected jointly to the output terminals of corresponding stages of each of said plurality of parallel shift registers.

5. A telephone signaling system in accordance with claim 3 including, in addition, output terminals on each of said stages and wherein said lamp amplifiers are individually connected to the output terminals of each of said stages of said shift registers.

6. An automatic telephone signaling system including a frequency generator for generating a series of alternating-current pulses of varying frequencies in accordance with a code combination, a plurality of parallel-connected shift registers, each of said shift registers including a plurality of stages, frequency discriminating means coupling said generating means to said shift registers, means included in said frequency discriminating means selectively responsive to said alternating-current pulses to simultaneously condition said shift register stages to binary states representative of said particular code combination; a plurality of lamp amplifiers individually connected to said shift register stages operable in response to the occurrence of a particular state in said stages for indicating the binary condition of said stages, wherein said shift registers comprise, in addition, a shift register gate interposed between adjacent stages including first and second input diodes, first and second output diodes, a pair of intermediate terminals serially coupling said first input diode to said first output diode and said second input diode to said second output diode, said terminals being adapted to assume a potential indicative of particular binary conditions, output conductors connected to said output diodes, a pair of condensers individually connected to said terminals and adapted to assume charges corresponding to said binary conditions, said condensers being responsive to the application thereto of an advance pulse to condition said output diodes and output conductors to potentials representative of said particular binary condition, and a source of reference potential connected to said terminals.

7. A telephone signaling system including generating means for generating a sequential series of alternating-current pulses of different frequencies in accordance with a code combination, a plurality of parallel-connected shift registers, detector means for coupling said generating means to initial stages of said shift registers, means included in said detector means selectively responsive to the generation of said alternating-current pulses to condition said initial shift register stages to a state representative of a particular alternating-current pulse, and a shift amplifier connected to said detector means and to said shift registers and responsive to the reception of said alternating-current pulses to advance the information stored in said registers, said means included in said detector means and said shift amplifier being jointly responsive to the reception of said series of pulses to condition said shift registers to a state representative of said code combination.

8. A telephone signaling system in accordance with claim 7 wherein said shift registers comprise, in addition, a shift register gate interposed between adjacent stages including first and second input diodes, first and second output diodes, a pair of intermediate terminals serially coupling said first input diode to said first output diode and said second input diode to said second output diode, said terminals being adapted to assume a potential indicative of particular binary conditions, output conductors connected to said output diodes, a pair of condensers individually connected to said terminals and adapted to assume charges corresponding to said binary conditions, said condensers being responsive to the application thereto of an advance pulse to condition said output diodes and output conductors to potentials representative of said particular binary condition, and a source of reference potential connected to said terminals.

9. A shift register gate including first and second input diodes, first and second output diodes, a pair of intermediate terminals serially coupling said first input diode to said first output diode and said second input diode to said second output diode, said terminals being adapted to assume a potential indicative of particular binary conditions, output conductors connected to said output diodes, a pair of condensers individually connected to said terminals and adapted to assume charges corresponding to said binary conditions, said condensers being responsive to the application thereto of an advance pulse to condition said output diodes and output conductors to potentials representative of said particular binary condition, and a source of reference potential connected to said terminals.

10. A shift register gate in accordance with claim 9 including impedance means connected between said source of reference potential and said pair of terminals.

11. A shift register gate in accordance with claim 9 wherein said diodes comprise semiconductor diodes.

12. A shift register gate in accordance with claim 9 including, in addition, a shift amplifier connected to said condensers and adapted to deliver said advance pulse to said condensers and to supply a source of reference potential to said condensers in the intervals between said advance pulses.

13. A shift register gate in accordance with claim 9 wherein said serially coupled diodes are similarly poled.

14. A shift register gate including first and second input diodes, first and second output diodes, a pair of intermediate terminals serially coupling said first input diode to said first output diode and said second input diode to said second output diode, said terminals being adapted to assume potentials indicative of a particular binary condition, output conductors connected to said output diodes, a pair of condensers individually connected to said terminals and adapted to assume charges corresponding to said binary condition, a flip-flop shift register stage connected to said output conductors, said condensers being responsive to the application thereto of an advance pulse to condition said shift register stage to a state representative of said particular binary condition, and a source of reference potential connected to said terminals.

15. A shift register gate including a preceding shift register stage and a succeeding shift register stage, first and second input diodes connected to said preceding shift register stage, first and second output diodes connected to said succeeding stage, a pair of intermediate terminals serially coupling said first input diode to said first output diode and said second input diode to said second output diode, said terminals being adapted to assume potentials indicative of a particular binary condition stored in said preceding shift register stage, a pair of condensers individually connected to said terminals and adapted to assume charges corresponding to said binary condition, said condensers being responsive to the application thereto of an advance pulse to condition said output diodes and succeeding shift register stage to a state representative of said particular binary condition, and a source of reference potential connected to said terminals.

16. A shift register gate in accordance with claim 15 including, in addition, a shift amplifier connected to said condenser and adapted to supply said advance pulses and, in addition, to supply a reference potential intermediate said advance pulses.

17. A trinary signaling device including means for generating a serially coded pulse combination of three possible frequencies, shift register storage means including a plurality of stages, detector means including a plurality of resonant circuits individually responsive to said three frequencies for coupling said generating means to said shift register, shift amplifier means connected to said detector means and said shift register storage means and responsive to the reception of each of said coded pulses for advancing the information stored in said shift register, and means included in said detector means and responsive to the reception of said pulses for conditioning said shift register stages to a state representing said code combination.

18. A trinary signaling device in accordance with claim 17 including, in addition, a plurality of transistor amplifiers interposed between said detector means and said shift register, said transistor amplifiers including in the base electrodes thereof breakdown diodes adapted to exhibit a low resistance forward conduction characteristic, a high resistance reverse conduction characteristic for voltages lower than a critical value, and a substantially constant voltage region in the reverse conduction characteristic for voltages exceeding said critical value.

19. A trinary signaling device in accordance with claim 18 wherein said shift register means includes first and second parallel-connected shift registers, and wherein three pairs of diodes couple said transistor amplifiers to said shift registers, one of said first and second pairs of diodes being connected to said first shift register, one of said second and third pairs of diodes being connected to said second shift register, the other of said first pair of diodes being connected to said second shift register and the other of said third pair of diodes being connected to said first shift register.

20. An automatic telephone signaling system comprising means for generating a series of successive alternating-current pulses of different frequencies in accordance with a code combination, a pair of parallel-connected shift registers, each of said shift registers having a plurality of stages equal in number to the number of pulses in a code combination, frequency detecting means connecting said generating means to the first stages of said shift registers for applying signals to said first stages in accordance with the particular frequencies of the transmitted pulses, means responsive to any output from said frequency detecting means for advancing said signals through said shift register stages, and indicating means connected individually to said shaft register stages to indicate the binary condition of said stages on receipt of the number of pulses in a code combination.

References Cited in the file of this patent

UNITED STATES PATENTS 2,769,865 Faulkner ---------------- Nov. 6, 1956